United States Patent
Fuhrmann et al.

(10) Patent No.: US 7,269,178 B2
(45) Date of Patent: Sep. 11, 2007

(54) RESOLUTION OF MEDIA ACCESS CONTENTIONS IN NETWORKS COMPRISING A PLURALITY OF NETWORK NODES AND AT LEAST ONE STAR MODE

(75) Inventors: Peter Fuhrmann, Aachen (DE); Wolfgang Budde, Aachen (DE)

(73) Assignee: NXP B.V., Eindhoven (NL)

( * ) Notice: Subject to any disclaimer, the term of this patent is extended or adjusted under 35 U.S.C. 154(b) by 924 days.

(21) Appl. No.: 09/826,700

(22) Filed: Apr. 5, 2001

(65) Prior Publication Data

US 2001/0048688 A1   Dec. 6, 2001

(30) Foreign Application Priority Data

Apr. 6, 2000   (DE) ............................... 100 16 829

(51) Int. Cl.
*H04L 12/28* (2006.01)
*H04L 12/56* (2006.01)
(52) U.S. Cl. ................ 370/407; 370/240; 370/425; 370/446
(58) Field of Classification Search ................ 370/407
See application file for complete search history.

(56) References Cited

U.S. PATENT DOCUMENTS

| 4,417,334 | A | * | 11/1983 | Gunderson et al. | .......... | 370/402 |
| 4,428,046 | A | * | 1/1984 | Chari et al. | .................. | 710/116 |
| 4,641,375 | A | * | 2/1987 | Dean | ............................ | 398/61 |
| 4,694,453 | A | * | 9/1987 | Kobayashi et al. | .......... | 370/249 |
| 4,700,344 | A | * | 10/1987 | Kaino et al. | ................. | 370/240 |
| 4,839,885 | A | * | 6/1989 | Wu | ............................. | 398/154 |
| 4,982,400 | A | * | 1/1991 | Ebersole | ...................... | 370/407 |

* cited by examiner

*Primary Examiner*—Chirag G. Shah

(57) ABSTRACT

The invention relates to a network comprising a plurality of network nodes. At least part of the network nodes are directly coupled to each other via at least one star node. The star node comprises a plurality of star interfaces which are assigned to at least one network node. In dependence on a respective pilot signal, a star interface conveys a message from the assigned network node to the other star interfaces, or from another star interface to at least one of the assigned network nodes. Also in the event of simultaneous arrival of at least two pilot signals at the respective star interfaces, a decision circuit releases one star interface for the transmission of data.

2 Claims, 4 Drawing Sheets

RESOLUTION OF MEDIA ACCESS CONTENTIONS IN NETWORKS COMPRISING A PLURALITY OF NETWORK NODES AND AT LEAST ONE STAR MODE

SUMMARY OF INVENTION

The invention relates to a network comprising a plurality of network nodes. Such network nodes may be used, for example, in motor vehicles, in aerotechnics and aerospace engineering, in industrial automation (for example, sensor systems) and domestic automation (e.g. lighting technology, alarm systems, central heatings, climatic control etc.).

In such a network for motor technology, for example, the TTP protocol (TTP=Time-Triggered Protocol) from the journal "Elektronik" no. 14, 1999, pp. 36 to 43 (Dr. Stefan Polenda, Georg Kroiss: "TTP: "Drive by Wire" in greifbarer Nähe") may be used. This protocol enables a reliable data transmission and may therefore also be used in networks for safety-relevant devices (for example brakes). In the article mentioned above, a bus system is mentioned as a network structure.

It is an object of the invention to provide another network comprising a plurality of network nodes.

The object is achieved by a network of the type defined in the opening paragraph,
in that at least part of the network nodes are directly coupled to each other via at least one star node,
in that the star node includes a plurality of star interfaces which are assigned to at least one network node,
in that one star interface transfers data from the assigned network node to the other star interfaces or from another star interface to at least one of the assigned network nodes each time in dependence on a pilot signal, and
in that also in the event of simultaneous arrival of at least two pilot signals at the respective star interfaces, a decision circuit releases one star interface for the transmission of data.

The idea on which this invention is based is the control of a star node by means of a pilot signal, which is generated by the network nodes. The pilot signal is modified before and after a transmission of a message, so that a star interface included in the star node and assigned to a network node recognizes when the assigned network node changes the pilot signal. In the star node the other star interfaces are then switched so that they receive only one message from the star interface that receives a message from the assigned network node.

Such a signaling is specifically suitable for time-controlled communication protocols, which guarantee via a respective access method (TDMA Time-Division Multiple Access) that only one respective network node can utilize the medium for transmitting its message. However, with such a method, the eventual access by only one network node cannot be guaranteed. The situation of a simultaneous access may occur both in the event of an error and during the start of the system i.e. in a transition phase, when the fixed time window is not predefined at one and the same time for all the nodes.

According to the invention, such an access contention is solved with the aid of a decision circuit, which, when a plurality of pilot signals arrive at the same time, releases a certain star interface for transmitting data. The resolution of the contention within the star node enables the use of the network also for protocols which, for example, for a decentralized system start, depend on a contention treatment. Particularly for applications that require the highest standards of reliability and availability from the communication system, each network node must be in a position, by predefining the communication frame, to correctly resume the exchange of messages with a system start or after the communication during operation has failed.

As described in patent claim 2, a certain, periodically repetitive time slot is assigned to each network node in the network, for transmitting its messages. The pilot signal generator in a network node signals this time slot when a pilot signal is transmitted. The pilot signal may be distinguished from the message per se in various ways. For example, the pilot signal uses a different frequency range from the signal having the message to be transmitted.

Patent claim 3 relates to a pilot signal evaluation circuit, which generates a send control signal which is activated when a pilot signal has been sent by the assigned network node and when no other star interface having a higher priority has simultaneously sent a pilot signal from the network node assigned to this other star interface. A star interface transfers data from the assigned network node to the other star interfaces only when the send control signal is activated.

Patent claim 4 indicates that each star interface includes a first and a second switch element. The switch elements as described in claim 5, which elements may be a switchable amplifier, control the flow of messages in a star interface in dependence on the pilot signal.

The decision which star interface is allowed to send data in the event of an access contention is made by a decision circuit. Two embodiments of decision circuits are explained in claims 6, 7 and 8.

Furthermore, the invention relates to a star node in a network for coupling a plurality of network nodes.

Examples of embodiment of the invention will be further explained hereinafter with reference to the Figures, in which:

DETAILED DESCRIPTION

Figure 1:
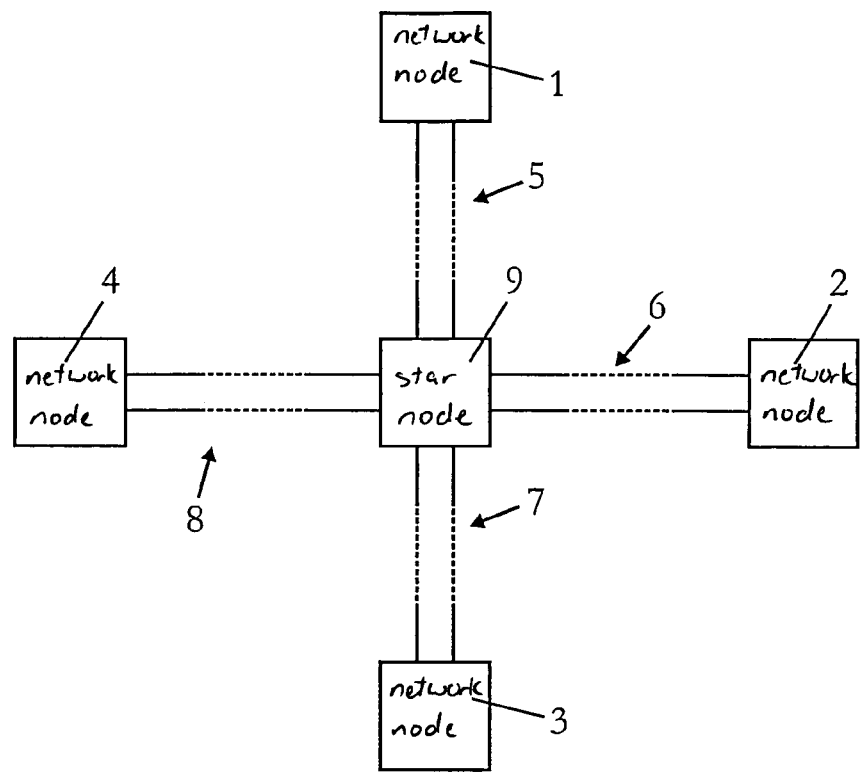
FIG. 1 shows a network in a star structure comprising a plurality of network nodes which are coupled via an active star node.

An example of embodiment of the network according to the invention is shown in FIG. 1. This network comprises, for example, four network nodes 1 to 4 which are coupled to each other via an active star node 9 through (twisted) line pairs 5 to 8 provided for a symmetrical signal transmission. The active star node 9 performs a line adaptation, so that the line pairs (5 to 8) in the active star node 9 are terminated by the wave resistance and detects a pilot signal transmitted by a network node 1 to 4. If the line pairs (5 to 8) were interconnected without an active star node 9, there would be a mismatch for each line pair in the star node as a result of the impedance jump from $Z_0$ to $\frac{1}{3} Z_0$, which is caused by the parallel combination of the respective other line pairs. For generating a pilot signal, each network node 1 to 4 includes a pilot signal generator.

Figure 2:
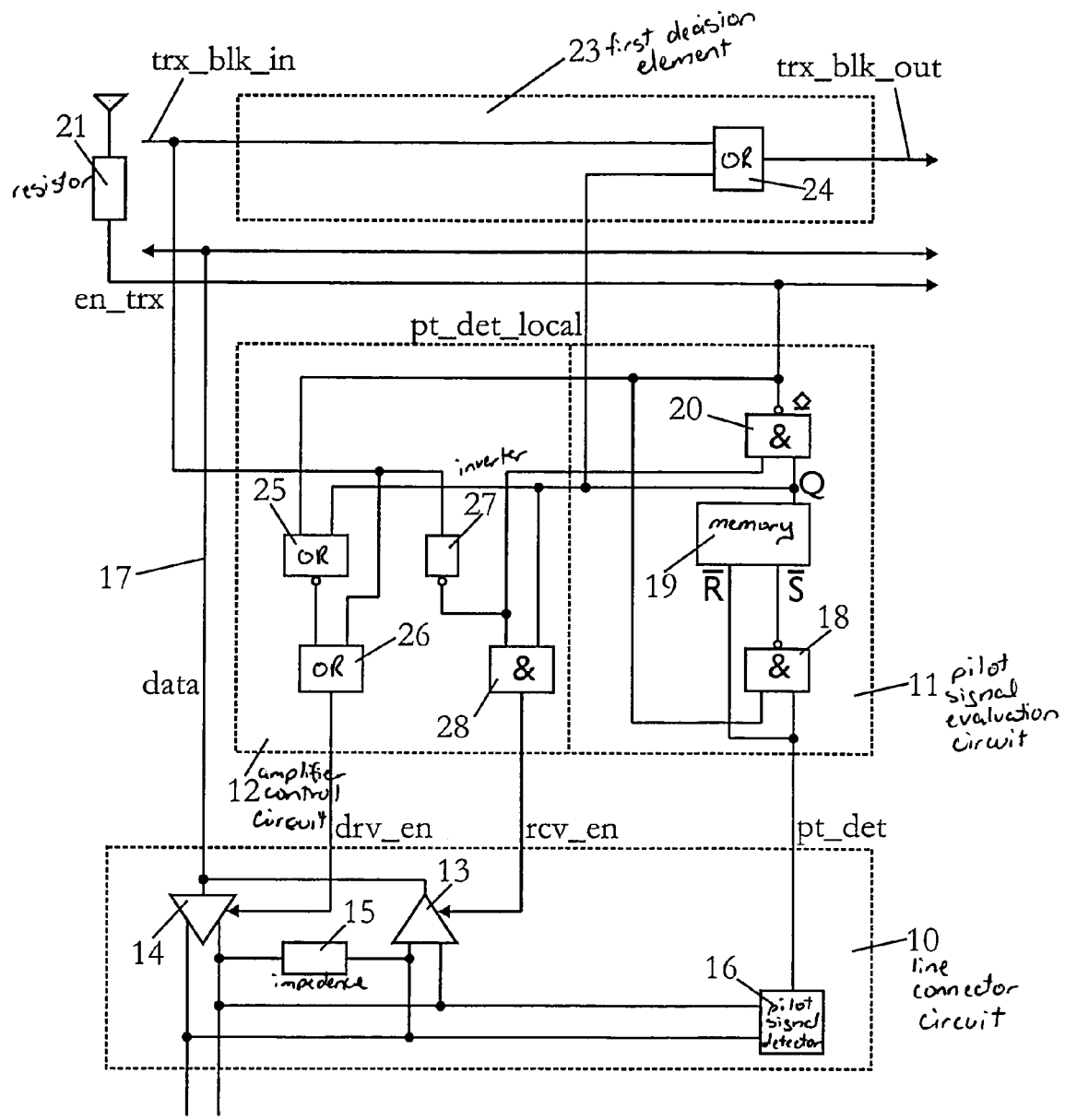
FIG. 2 shows an embodiment of a star interface in a star node.

The active star node 9 includes for each line pair (5 to 8) a star interface, which enables the messages of a transmitting network node to be transferred to all the other network nodes connected to the active star. An example of embodiment of such a star interface is shown in FIG. 2, which includes a line connector 10, a local pilot signal evaluation circuit 11 and a local amplifier control circuit 12.

The line connector circuit 10 includes two switchable amplifiers 13 and 14, a terminating impedance 15 and a pilot signal detector 16. A line pair (5 to 8) (see FIG. 1) is connected to the inputs of the switchable amplifier 13, to the outputs of the switchable amplifier 14, to the inputs of the pilot signal detector 16 and to the terminating impedance 15. The value of the terminating impedance 15 corresponds to the characteristic impedance and is therefore used for the correct line termination.

When the switchable amplifier 13 is activated by a switch signal rev_en produced by the local amplifier control circuit 12, the data coming from the assigned line pair are led to a data line 17 (data) and then transferred to the other star interfaces. When the switchable amplifier 14 is activated by a switch signal drv_en, which is also produced by the amplifier control circuit 12, the data arriving over the data line 17 from another star interface are fed to the assigned line pair (5 to 8). A switchable amplifier 13 or 14 may also be arranged as a series combination of amplifier and switch (switch element). In the closed state of this switch the output signal of the amplifier 13 or 14 is transferred.

When the pilot signal detector 16 detects a pilot signal on the line pair (5 to 8), this indicates the control signal pt_det generated by the pilot signal detector, for example, by a change of state from a low to a high state. The output of the pilot signal detector 16 is connected to the input of an inverting AND gate 18, which forms part of the pilot signal evaluation circuit 11. The pilot signal evaluation circuit 11 furthermore includes a memory arrangement 19 (for example, RS flip-flop) which can be set and reset and a further inverting AND gate 20, which has an open collector output. The memory arrangement 19 has a set input $\overline{S}$, a reset input $\overline{R}$ and an output Q. The truth table for this memory arrangement 19 has the following contents:

| $\overline{S}$ | $\overline{R}$ | Q |
|---|---|---|
| 0 | 0 | 1 |
| 0 | 1 | 1 |
| 1 | 0 | 0 |
| 1 | 1 | Q |

The inverting output of the AND gate 18 is connected to the set input $\overline{S}$ of the memory arrangement 19, whose output Q is connected to an input of the AND gate 20. The reset input $\overline{R}$ of the memory arrangement 19 is still coupled to the output of the pilot signal detector 16 and the output of the AND gate 20 is connected to a further input of the AND gate 18.

The inverting output of the AND gate 20, which AND gate produces a send control signal en_trx, is coupled to a voltage source via a resistor 21. The output of the inverting AND gate 20 thus represents an open collector output.

The recognition of a pilot signal by the pilot signal detector 16 is not sufficient for determining whether the pilot signal has been sent by the assigned network node or whether the pilot signal has been fed to the assigned line pair via the star node 9. However, this is necessary for determining whether the assigned network node is an active sender of a pilot signal and thus also of the subsequent data. For this purpose is used the pilot signal evaluation circuit 11 with the memory arrangement 19 which stores the respective state of the control signal pt_det of the pilot signal detector.

The output signal on the output Q of the memory arrangement 19 controls the AND gate 20, which influences the send control signal en_trx and, together with the resistor 21 and the AND gates 20 of the other star interfaces, forms a wired OR circuit. The send control signal en_trx is considered to be non-active as long as a high state (logic 1 level) is obtained. This is obtained by the connected resistor 21, which keeps the send control signal en_trx at the logic "1" level. An activation takes place i.e. the send control signal en_trx is active as a result of the switching at the logic "0" level (active low). When one of the star interfaces connected to the resistor 21 signals a send request by a change of state of the output signal of the assigned AND gate 20, the send control signal en_trx becomes active and this change of state can therefore be recognized by the further star interfaces.

If a star interface activates the send control signal en_trx through its AND gate 20, this provides in all the other star interfaces that a send request arriving at a later time, signaled by the control signal pt_det, cannot be met. This is ensured by the inverting AND gate 18, which prevents the transfer of the control signal pt_det in the event of an active send control signal en_trx. In the star interface that has activated the send control signal en_trx itself, the set signal for the memory arrangement 19 is also switched off by the AND gate 18. However, the previously set state is maintained by the memory arrangement until the assigned pilot signal detector 16 signals the end of the transmission. At the end of the transmission the pilot signal detector 16 deactivates the control signal pt_det and thereby resets the memory arrangement 19 through the reset input $\overline{R}$. Via the AND gate 20 the send control signal en_trx is no longer activated and brought back to the inactive state (logic 1 level) through the resistor 21.

Figure 3:
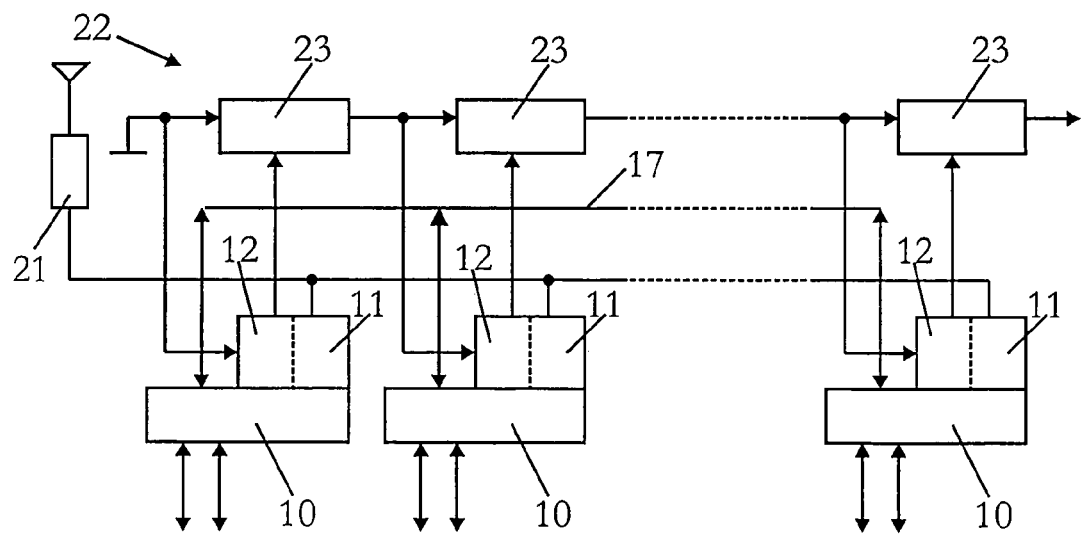
FIG. 3 shows an embodiment of a star node with a plurality of star interfaces.

In the active star node 9 is further included a decision circuit 22 (FIG. 3). The decision circuit 22 has a decision element 23 for each star interface, which decision element 23 includes an OR gate 24. As shown in FIG. 3, the decision elements 23 are chained and form the decision circuit 22. Additionally, FIG. 3 shows the line connectors 10 which are assigned to a decision element 23, local pilot signal evaluation circuits 11 and amplifier control circuits 12. A decision element 23 assigned to a star interface receives as a local send request signal p_det_local the output signal of the memory arrangement 19. The local send request signal p_det_local is applied to a first input and a decision control signal trx_blk_in is applied to a second input of the OR gate 24. The output signal trx_blk_out of this OR gate 24 is applied to the next decision element 23 as a decision control signal trx_blk_in. The first input of the OR gate 24 of the first decision element 23 of the chain is connected to a ground terminal (logic 0 level). This circuit provides that the star interface, whose assigned decision element 23 is connected to ground, has the highest priority. The star interfaces of the assigned subsequent decision elements 23 in the chain have a lower priority depending on their position in the chain. The star interface, whose decision element 23 is arranged at the end of the chain, consequently has the lowest priority (compare FIG. 3).

The output signal trx_blk_in of a decision element 23, which is assigned to the higher priority star interface, controls the switchable amplifiers 13 and 14 via the amplifier control circuit 12. The amplifier control circuit 12 includes two OR gates 25 and 26, one inverter 27 and one AND gate 28. A first input of the OR gate 25 is connected to the output of the AND gate 20 and a second input of the OR gate 25 to the output of the memory arrangement 19. An inverting output of the OR gate 25 leads to a first input of the OR gate 26, whose second input is supplied with the decision control signal trx_blk_in and whose output is connected to a switch input (switch signal drv_en) of the switchable amplifier 14. The inverter 27 receives the decision control signal trx_blk_in. The first input of the AND gate 28 is connected to the output of the inverter 27, the second input to the output of the memory arrangement 19 and the output of the AND gate 28 to the switch input (switch signal rcv_en) of the switchable amplifier 13. The output of the inverter 27 is furthermore coupled to a second input of the AND gate 20.

In the following the cases are described when no star interface having a higher priority signals a send request and thus the decision control signal trx_blk_in is not activated.

In the first case, it is assumed that the local send request signal pt_det_local is not active. This means that the memory arrangement 19 is not set and no pilot signal was detected on the assigned line pairs (5 to 8). Furthermore, the send control signal en_trx is not active either, which means that no other star interface signals the recognition of a pilot signal either. Then the switch signal drv_en is deactivated for the switchable amplifier 14 via the OR gates 25 and 26, which means that the amplifier 14 is switched off. At the same time also the switchable amplifier 13 is switched off via the switch signal rcv_en, which is guaranteed by the gates 27 and 28. This case is referred to as a state of rest of the active star node 9.

In the second case, another star interface controls the local amplifier control circuit 12 of the star interface concerned with the aid of the send control signal en_trx. Via the activated send control signal en_trx the switchable amplifier 14 is switched on by the switch signal drv_en, and the switchable amplifier 13 is switched off via the switch signal rcv_en. In this configuration the star interface conveys the data, which is fed to the star node 9 via the data line 17, to the connected memory arrangement 19. In order that on the assigned line pair (5 to 8) the pilot signal co-transmitted with the data does not lead to a feedback in the amplifier control circuit 12, the control signal pt_det generated by the pilot signal detector 16 is blocked at the AND gate 18. The send control signal en_trx provides that the control signal pt_det does not have any influence on the set input $\overline{S}$ of the memory arrangement 19.

In the third case it is assumed that a star interface is the first one to detect a pilot signal on the line pair (5 to 8). Then, via the AND gate 18 and the memory arrangement 19, the local send request signal pt_det_local is activated and so is the send control signal en_trx via the AND gate 20. As a consequence of the activation of the local send request signal pt_det_local, the switchable amplifier 13 is turned on and the switchable amplifier 14 is turned off. Data transmitted by the connected network node are then fed to the star node 9 and a feedback to the line pair (5 to 8) is prevented by the switchable amplifier 14. All the other star interfaces behave as described above as a result of the activated send control signal en_trx. Data arriving over the data line 17 are transferred to the assigned line pair (5 to 8) via a switchable amplifier 14 of another star interface.

In the active star node 9 without a decision circuit 22, both in the event of an error, which means that a network node sends outside the time slot assigned to it, and during the start of the system, it is possible that a simultaneous access of a plurality of star interfaces to the data line 17 occurs. This means that at the same time two or more different network nodes can transfer their data to the active star node 9. How the network according to the invention solves such a media access contention is described in the following.

In the case of a media access contention in a star interface the detection of a pilot signal has already led to the fact that the memory arrangement 19 is set via the control signal pt_det and thus the local send request signal pt_det_local is active. In parallel therewith, one or more other star interfaces of the same star node 9 have also detected a pilot signal on their assigned line pair and have also activated their local send request signal pt_det_local. In this case the send control signal en_trx is activated by a plurality of star interfaces, without this, with the aid of the AND gate 18, having any influence on the contents of the memory arrangement 19. The activation of the send control signal en_trx by another star interface cannot be recognized by a star interface with its own send request (pilot signal occurs), because this is not made possible by the wired OR circuit described above. All the star interfaces having the intention to send and having a detected pilot signal therefore activate their respective switchable amplifier 13 and turn off the switchable amplifier 14. The result is a collision of the various data on the data line 17. As a result of the turned-off amplifier 14, this collision, however, does not become visible in the respective network nodes, which send their data to the network node 9.

A priority control, which will be described in the following, then overtakes the solution of this undesired network constellation. A plurality of star interfaces activate, as described, their local send request signal pt_det_local. These local send request signals pt_det_local are fed to the respectively assigned decision elements 23 (compare FIG. 3). Only for the star interface having the highest priority will the decision control signal trx_blk_in remain inactive and thus the set amplifier configuration will be maintained in this star interface. For all the other star interfaces the decision control signal trx_blk_in becomes active and effects a change in the amplifier control circuit 12. Via the OR gates 25 and 26 the switchable amplifier 14 is turned on and the switchable amplifier 13 is turned off. In addition, the decision control signal trx_blk_in avoids that a star interface, whose send request is not continued, furthermore activates the send control signal en_trx. The inverting AND gate 20 combines the local send request signal pt_det_local and the decision control signal ntrx_blk_in applied via the inverter 27 and thereby causes the local send request signal pt_det_local to have no influence anymore on the send control signal en_trx when the decision control signal trx_blk_in is activated.

The contention of a plurality of data meeting each other on the data line 17 inside the star node 9 is taken out of the star node 9 and transferred to the line pair (5 to 8) connected to the respective transmitting network node. On the line pairs (5 to 8) assigned to a transmitting network node there is then a contention between the data of the transmitting network node, whose assigned star interface has the highest priority of the star interfaces causing the contention, and the data of the respective network node connected to the line pair. The media access contention in a network having active star nodes 9 can be recognized by each transmitting network node. This network node is then put to a position to stop its own send operation in case of a contention.

For the undisturbed functioning of the active star node 9 it is necessary that in a certain dead time no network node is active or sends messages or data, respectively. In this state the star node is fully blocked (all the amplifiers 13 and 14 are deactivated). In this state a star interface in the network node 9 waits for the new pilot signal by which a request for transmission of data is indicated.

Basically, the pilot signal must always be transmitted prior to the beginning of the actual transmission of the message. Only then is ensured that the active star node 9 in a contention-free communication control (TDMA) is timely configured and also the beginning of the message reaches all the other network nodes.

Figure 4:
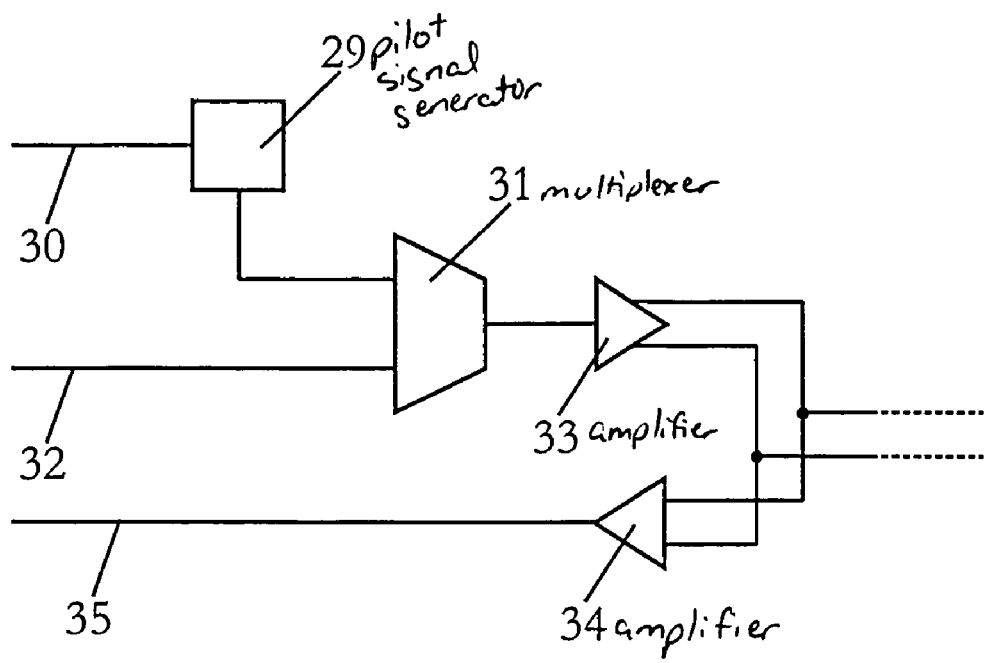
FIG. 4 shows part of a network node with a pilot signal generator.

FIG. 4 shows in what way the pilot signal is generated in a network node 1 to 4 and transmitted over a line pair 5 to 8. If a network node wishes to send a data to other network nodes, a pilot signal generator 29 will receive, for example, a start signal over a line 30. The pilot signal generator 29 then applies a pilot signal to a multiplexer 31, to which are additionally sent data over a line 32. The signal produced by the multiplexer 31 is fed to the assigned line pair via an amplifier 33. A signal coming from another network node is led from the line pair (5 to 8) over an amplifier 34 to a line 35 to be further processed.

The multiplex shown in FIG. 4 may then be arranged both as a time-division multiplexer (sending the pilot signal as a start and stop signal before and after the actual message, respectively) or as a frequency-division multiplexer. This means that the pilot signal can accompany as a continuous signal the whole message to be transmitted, or that it can be sent in the form of a start and stop signal. For example, by different durations it can be ensured that start and stop signals are sufficiently different and the change between transmission interval and transmission pause is not mixed up.

The pilot signal may be generated in various ways. One possibility is that it may be a periodic signal, whose frequency range lies outside the frequency range utilized for the transmission of the messages. This frequency range may lie above or below the useful frequency band, but also in "gaps" of the useful frequency band, when the useful band is accordingly specified due to the narrow-band nature of the pilot signal. A further possibility is to transmit the actual message as a symmetrical push-pull signal and the pilot signal as an in-phase signal. The in-phase signal may be embodied both in the form of a constant voltage and in the form of a periodic signal. A third possibility for the pilot signal is that this pilot signal is realized in the form of special symbols preceding or following the transmission of the message.

The proposed invention is particularly suitable for use in networks functioning in accordance with the TTP protocol for a real-time communication, for example, in the motor vehicle (compare Elektronik Heft 14/1999: "TTP: "Drive by Wire" in greifbarer Nähe", pp. 36 to 43). In this protocol is determined, on the one hand, when what transmitter is allowed to transmit with the aid of the contention-free TDMA access method (TDMA=Time-Division Multiple Access), and on the other hand, a dead time (interframe gap) is defined in which no transmitter is allowed to transmit. This mechanism guarantees that the active star node 9 always comes back to the state of rest. The TDMA method guarantees that always only one network node is allowed to send a message at the predefined time, and for this purpose, by means of its transmitted pilot signal, activates in the star node, or causes the star interface assigned thereto, to transfer the messages. The resolution of media access contentions, which may occur also in the described protocol during the starting phase of the system, is guaranteed by the priority controller.

An additional advantage of the present invention, when applied to a TTP network, consists in that for driving the so-called bus guardian a control signal is to be available in the network node, which control signal lies shortly before the beginning of the transmission of the message. This control signal can immediately be used for driving the pilot signal generator 29 in that this control signal is applied to the pilot signal generator 29 over the line 30. Naturally, this control signal may also be generated with a respective leader routine, but also by the instance that itself initiates a send operation in the network node.

Figure 5:
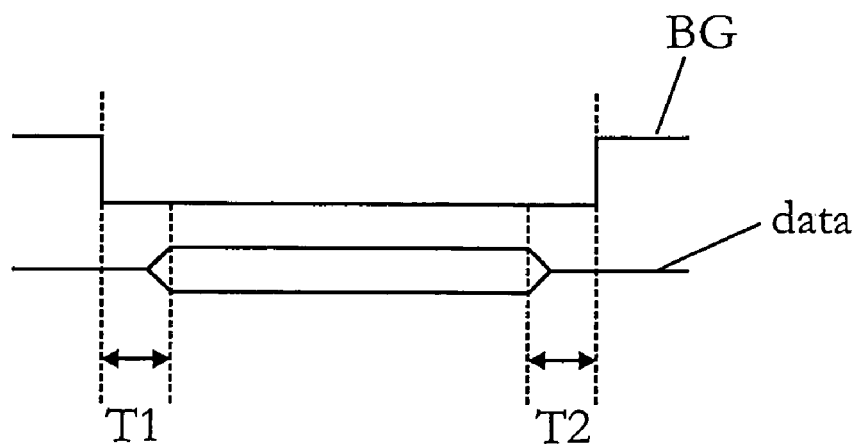
FIG. 5 shows part of a timing diagram of two signals in the network.

In FIG. 5 this control signal is referred to as BG and the actual data as data. The control signal BG is, for example, in a low state during the transmission of data. During this low state of the control signal the data are to be transmitted. A first time space T1 after a change of the control signal to the low state and a second time space T2 before a change of the control signal to the high state are then to be selected such that the active star node 9 is configured correctly and remains like that to be able to transmit a message without any errors. It should further be observed that the TTP protocol supports different (constant) message delays between various network nodes in the network. In this way the delay caused by the active star node 9 does not violate the TTP protocol.

The network according to the invention enables the transmission of a pilot signal with any kind of signal transmission for the messages from a network node 1 to 4. For example, a symmetrical push-pull transmission, single line transmission or carrier frequency modulated transmission may be selected for the transmission of messages. With an in-phase coupling of the line pairs 5 to 8, also a supply voltage could be co-transmitted with the transmission of messages, as the case may be.

Figure 6:
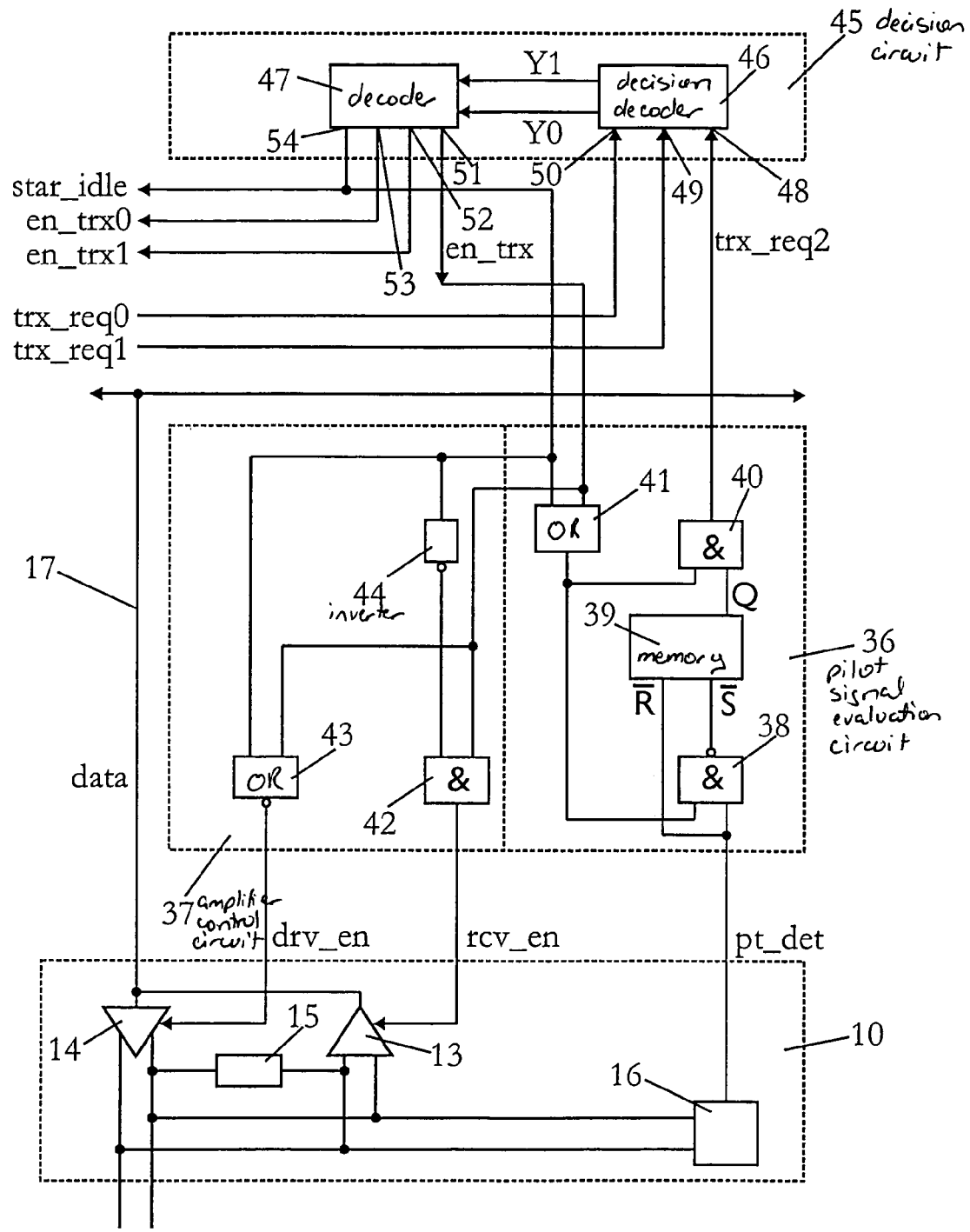
FIG. 6 shows a further embodiment of a star interface.

A further example of embodiment of a star interface is shown in FIG. 6, with the line connector circuit 10, a local pilot signal evaluation circuit 36 and a local amplifier control circuit 37. The output of the pilot signal detector 16 producing the control signal pt_det is connected to a first input of an inverting AND gate 38, which forms a component part of the pilot signal evaluation circuit 36 as do a memory arrangement 39, an AND gate 40 and an OR gate 41. The inverting output of the AND gate 38 is connected to the set input $\overline{S}$ of the memory arrangement 39, whose reset input $\overline{R}$ is connected to the output of the pilot signal detector 16 and its output Q to a first input of the AND gate 40. The memory arrangement 19 has the same truth table as the memory arrangement 19 of FIG. 2. The second input of the AND gate 40 and the second input of the inverting AND gate 38 are connected to the output of the OR gate 41.

The amplifier control circuit 37 comprises an AND gate 42, an inverting OR gate 43 and an inverter 44. The output of the AND gate 42 produces the switch signal rcv_en for the switch input of the switchable amplifier 13 and the output of the OR gate 43 produces the switch signal drv_en for the switch input of the switchable amplifier 14. The first input of the OR gate 43 is connected both to the first input of the AND gate 42 and to the first input of the OR gate 41 and the second input of the OR gate 43 to the input of the inverter 44 of both to the input of the inverter 44 and to the second input of the OR gate 41. The output of the inverter 44 further has a connection to the second input of the AND gate 42.

The active star node includes, in addition to a multitude of star interfaces, a decision circuit 45 with a decision decoder 46 and a 1-from-m decoder 47. In the FIG. 2 the decision circuit 45 is arranged for three star interfaces. This means that the decision decoder 46 has three inputs 48 to 50 and the 1-from-m decoder 47 has four outputs 51 to 54 (m=4). The decision decoder 46 and the 1-from-m decoder 47 are combined via two connections (Y0, Y1). The input 48 of the decision decoder 46 is supplied with the signal trx_req2 from the output of the AND gate 40 of the star interface shown in FIG. 6 and the inputs 49 and 50 with the signals trx_req1 and trx_req0 from outputs of the AND gate 40 of further star interfaces not shown here. The output 51 of the 1-from-m decoder 47 applies the signal en_trx2 to the first input of the OR gate 41 and the outputs 52 and 53 the signals en_trx1 and en_trx0 to the first inputs of the OR gate 41 of the other star interfaces. A signal star_idle of the output 54 of the 1-from-m decoder 47 is further applied to every second input of the OR gate 41 of the star surfaces.

The decoder 46 may be described via the following truth table

| trx_req2 | trx_req1 | trx_req0 | Y1 | Y0 |
|----------|----------|----------|----|----|
| 0 | 0 | 0 | 0 | 0 |
| 0 | 0 | 1 | 0 | 1 |
| 0 | 1 | x | 1 | 0 |
| 1 | X | x | 1 | 1 | and the 1-from-m decoder with m=4 via the following truth table

| Y1 | Y0 | en_trx2 | en_trx1 | en_trx0 | star_idle |
|----|----|---------|---------|---------|-----------|
| 0 | 0 | 0 | 0 | 0 | 1 |
| 0 | 1 | 0 | 0 | 1 | 0 |
| 1 | 0 | 0 | 1 | 0 | 0 |
| 1 | 1 | 1 | 0 | 0 | 0 |

The outputs of the decision decoder 46 and the inputs of the 1-from-m decoder 47, respectively, are referred to as Y0. "x" is understood to mean that the state may be any state.

It is assumed that the active star node 9 is in the rest state i.e. none of the network nodes connected to the star node 9 sends data. If a network node wishes to send data, this is shown by the network node by sending a pilot signal. If the pilot signal detector 16 of the assigned start interface detects the pilot signal, this is announced to the decision decoder 46 on the output 48 by activation of the send control signal trx_req2 generated by the local pilot signal evaluation circuit 36. The other inputs 49 and 50 of the decision decoder 46 receive the send control signals trx_req1 and trx_req0, which come from the pilot signal evaluation circuits 36 of the other star interfaces.

The decision decoder 46 and the following 1-from-m decoder 47 are arranged such that the decision control signal star_idle on the output 54 of the 1-from-m decoder 47 is activated when none of the send control signals trx_req0, trx_req1 and trx_req2 produced by the respective decision decoders 46 is activated. In this state a send control signal trx_req0, trx_req1 and trx_req2 may be activated when the associated pilot signal detector 16 has detected the pilot signal. The decision circuit 45 is arranged so that the star interface that generates the send control signal trx_req2 has a higher priority than the star interface that generates the send control signal trx_req1 and than the star interface that generates the send control signal trx_req0. The star interface that generates the send control signal trx_req1 again has a higher priority than the star interface that generates the send control signal trx_req0.

If a star interface activates the send control signal trx_req0 earlier than the other star interfaces detect possible pilot signals, the other send control signals trx_req1 and trx_req2 are prevented via the OR gate 41 and the inverting AND gate 38 from being activated. The same holds for the other send control signals trx_req1 and trx_req2. This means that an activated decision control signal trx_req0, trx_req1 or trx_req2 prevents the respective other send control signals formed by a pilot signal evaluation circuit 36 from being activated.

The amplifier control circuit 37 is also controlled by the decision control signals star_idle and en_trx2, which are generated by the 1-from-m decoder 47. The other two star interfaces not shown in FIG. 6 receive the decision control signals star_idle and en_trx0 or en_trx1, respectively, for controlling their respective amplifier control circuits 37. In the state of rest, the two switchable amplifiers 13 and 14 are turned off. When a pilot signal is detected by the assigned pilot signal detector 16, the amplifier 14 and the amplifier 13 are turned off by an activation of the decision control signal en_trx2. In this manner the assigned network node (1 to 4) can transfer data via the data line 17 to other star interfaces.

If a star interface has not detected a pilot signal, or if the generation of a send control signal of the pilot signal evaluation circuit 36 has been blocked, the two decision control signals star_idle and en_trx2 (or en_trx0 or en_trx1), generated by the 1-from-m decoder 47 and applied to the assigned star interface, are not activated. The amplifier control circuit 37 then activates the switchable amplifier 14 to receive data from the control line 17. The amplifier 13 is turned off.

The media access contention is resolved by the decision circuit 45 in the example of embodiment of FIG. 6. Only the star interface having the highest priority can send data in the event of a simultaneous send request (via the pilot signal). The star interfaces having a lower priority receive non-activated decision control signals from the 1-from-m decoder 47 to prevent the associated amplifier 13 from being started. The other amplifier 14, on the other hand, is turned on.

The invention claimed is:

1. A network comprising:
    a plurality of network nodes, the network nodes are directly coupled to each other via at least one star node;
    the at least one star node includes a plurality of star interfaces that are assigned to at least one respective network node, with one star interface transferring data, in dependence on a pilot signal varying frequency, from the assigned respective network node to the other star interfaces or from another star interface to the assigned respective network node,
    pilot signal evaluation circuit generates a send control signal and activates the send control signal if a pilot signal has been sent by the assigned network node and no other star interface having a higher priority has simultaneously sent a pilot signal from the network node assigned to this other star interface,
    a star interlace is provided for transferring data from the assigned network node to the other star interfaces only when the send control signal is activated,
    each star interface includes a first and second switching amplifiers, the first switching amplifier in an activated state passes data from the assigned network node to the other star interfaces, and the second switching amplifier in an activated state passes data from the other star interfaces to the assigned network node, and in the event of receiving the active send control signal, the first switching amplifier is in an active state and the second switching amplifier is in a non-active state, a decision circuit evaluates the send control signals of all the star interfaces, and with a simultaneous occurrence of various send control signals corresponding to the simultaneous arrival of at least two pilot signals at respective star interfaces, the decision circuit releases via a decision control signal a certain star interface for the transmission of data, and the decision circuit includes a chain of in-line decision elements each having an OR gate that combines the output signal of the previous decision element with a local send request signal generated by the pilot signal evaluation circuit and indicating the presence of the pilot signal, the output signal of an OR gate being the decision control signal for the star interface assigned to the next decision element in the chain.

2. A network as defined in claim 1, wherein the decision circuit includes a decision decoder decoding the send control signals, and a 1-from-m decoder receiving the output signals of the decision decoder, which 1-from-m decoder generates a respective decision control signal for the respective star interfaces.

* * * * *